Patented Mar. 10, 1936

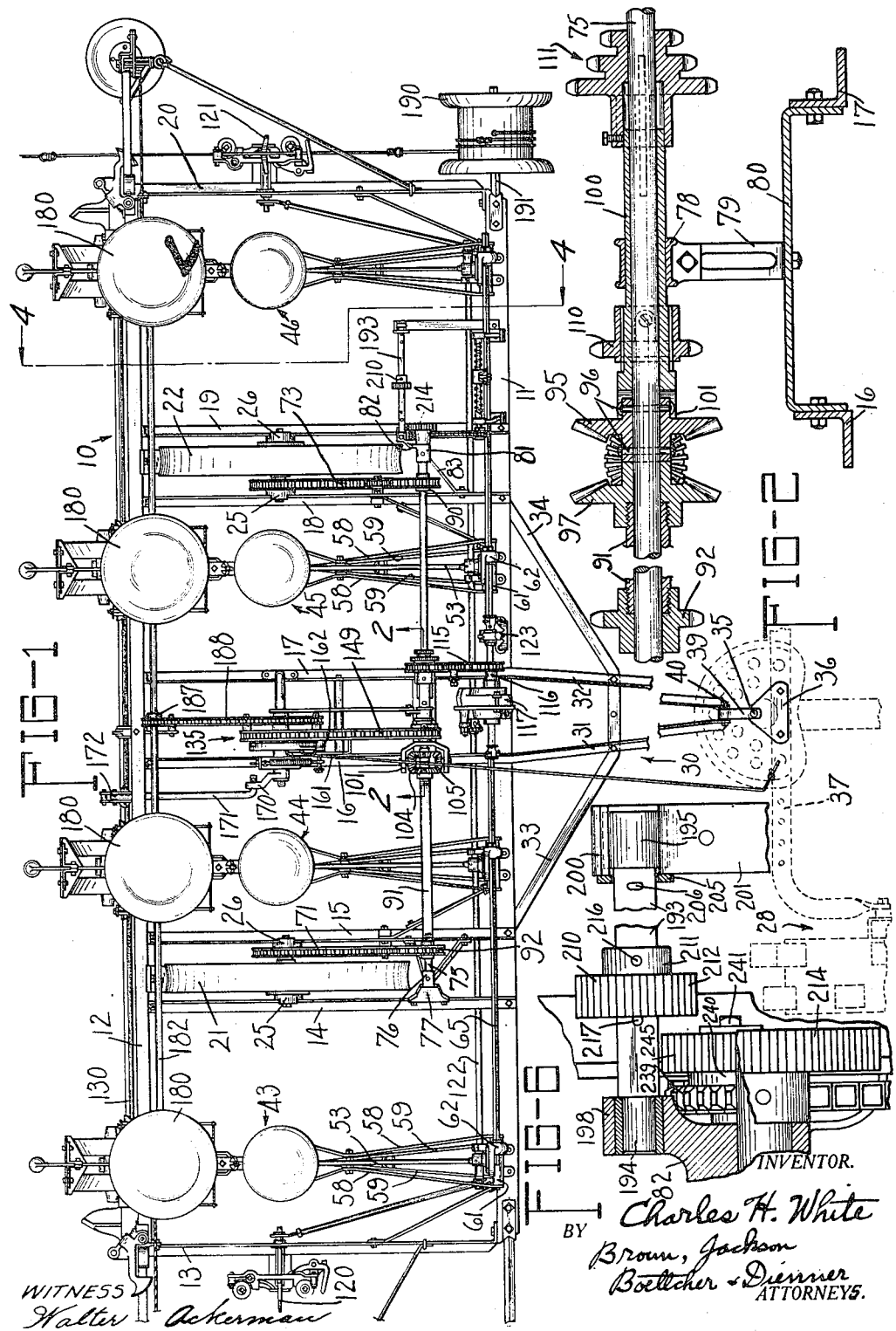

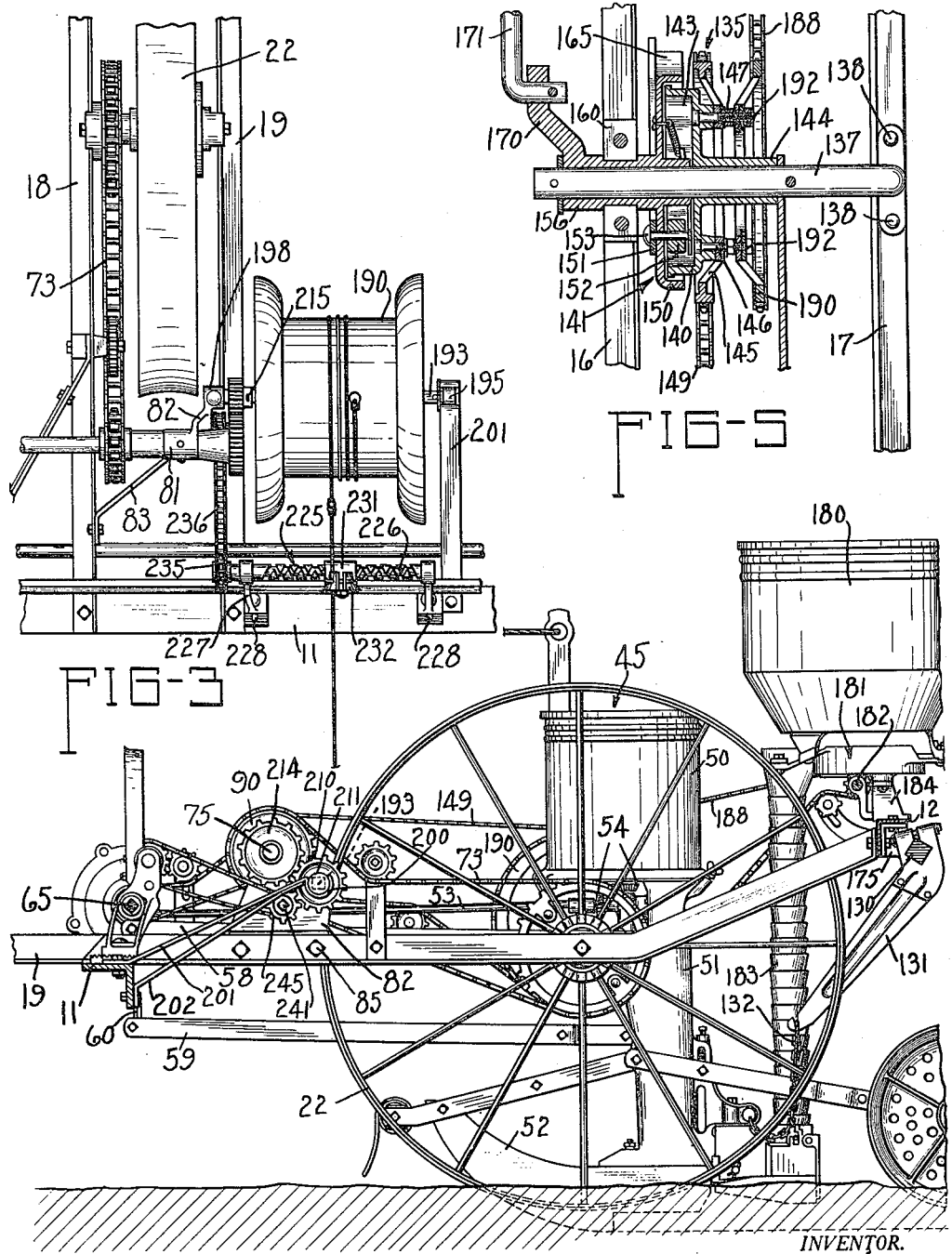

2,033,366

UNITED STATES PATENT OFFICE 2,033,366

PLANTER

Charles H. White, Moline, Ill., assignor to Deere & Company, Moline, Ill., a corporation of Illinois Application August 29, 1932, Serial No. 630,799

29 Claims. (Cl. 111—59)

The present invention relates generally to agricultural implements and more particularly to planting implements of the multiple row type. Briefly, the principal object of the present invention is the provision of new and improved means for delivering power from the two or more supporting wheels to operating units carried thereby, such as the seeding mechanism, the power lift mechanism which is actuable to raise and lower the one or more planting units, and the fertilizer distributing mechanism. The present invention also contemplates, in this connection, new and improved reeling mechanism associated with the power delivering means whereby, when the implement is of the check row type, the reeling of the check wire may be easily and quickly accomplished.

Another object of the present invention is the provision of new and improved power delivering means for the operating units or mechanisms of the implement, which power delivering means includes differential mechanism adapted to derive its energy from two or more supporting wheels at the same time, whereby an easy and steady running machine is provided. More specifically, the present invention contemplates the provision of a differential mechanism which includes laterally extending shaft means having the laterally outer ends thereof connected with the supporting wheels and the differential mechanism proper mounted on the shaft means intermediate the ends thereof and operatively connected with seeding mechanism and the power lift mechanism. Also, the present invention contemplates actuating fertilizer distributing means from the same differential mechanism.

Another object of the present invention is a new and improved power lift clutch construction, particularly adapted to be embodied in an agricultural implement employing the features mentioned above. The present invention contemplates providing a power lift clutch which includes a shaft fixed at one end to the frame of the implement and having its other end supported by one of the clutch elements, which element is journaled for rotation on one of the frame members. Specifically, the present invention also contemplates actuating the fertilizer distributing mechanism from one of the constantly rotating clutch elements.

In connection with the reeling mechanism, the present invention particularly contemplates providing not only means for rotating the reel itself but also means for distributing the wire uniformly thereon. One of the specific features of the present invention in this connection is the arrangement of a single shiftable part for establishing driving connection between the power delivering means and, not only the reel supporting shaft itself but also the check wire distributing mechanism as well.

These and other objects of the present invention will be apparent from the following description of the preferred structural embodiment, taken in conjunction with the accompanying drawings illustrating by way of example, such preferred embodiment.

In the drawings:

Figure 1 is a top plan view of a four row planter embodying the principles of the present invention;

Figure 2 is an enlarged vertical section taken along the line 2—2 of Figure 1 through the differential mechanism and the supporting bearing means therefor;

Figure 3 is a fragmentary plan view, on a somewhat enlarged scale, illustrating the check wire reel in place and operatively connected with the power delivering means so that the latter will drive not only the reel itself but also the wire distributing mechanism;

Figure 4 is a vertical section taken along the line 4—4 of Figure 1;

Figure 5 is a horizontal section taken through the power lift clutch and showing the associated means by which it derives power from the differential mechanism and by which power is delivered to the fertilizer distributing mechanism; and Figure 6 is a fragmentary detail view, partly in section and partly in elevation, illustrating the shiftable member which establishes driving connection with the power delivering means and both the reel shaft and the check wire distributing mechanism.

Referring now to the drawings, more particularly to Figure 1, the reference numeral 10 designates the main frame of a four row planter. The main frame of the planter comprises a front transverse member 11 and a rear transverse member 12. The transverse frame members are connected together by a plurality of longitudinal frame members, indicated by the reference numerals 13 to 20, inclusive, these longitudinal frame members interconnecting the transverse frame members and constituting in connection therewith a sturdy frame construction for supporting the various planting and operating units of the implement. The rear ends of the longitudinally extending frame members are inclined upwardly, as best shown in Figure 4.

The main frame 10 is carried upon a plurality of supporting wheels. Preferably, a pair of wheels 21 and 22 are employed, and these wheels have suitable axles journaled in bearings 25 and 26 fixed to certain of the longitudinally extending frame members. As illustrated, the bearing means for the wheel 21 is secured to the frame members 14 and 15, and the bearing means for the wheel 22 is secured to the transverse members 18 and 19. The supporting wheels 21 and 22 are thus disposed in between the transverse frame members 11 and 12 and are spaced slightly to the rear of the transverse axis of the frame.

The front end portion of the main frame is supported upon a tractor 28, by which the machine is preferably drawn. For this purpose, a draft frame 30 is provided and which comprises forwardly extending members 31 and 32 and diagonally disposed braces 33 and 34. Preferably, the forwardly extending members 31 and 32 are extensions of the central pair of longitudinally extending frame members 16 and 17, and the braces 33 and 34 may be made in one piece, if desired. The front end of the draft frame 30 is connected by means of a vertical pivot 35 extending through a hole in a plate 36 secured, as by bolts, to the draw bar 37 of the tractor. The vertical pivot 35 is established by means of a clevis 39 to which the forward ends of the members 31 and 32 are pivotally connected on a horizontal axis, as by a bolt 40.

The several planting units are movable carried by the main frame 10 for vertical adjustment, and preferably the units are spaced laterally along the main frame and disposed in between adjacent longitudinally extending frame members. Since the implement illustrated is a four row planter, four planting units are shown, being indicated by the reference numerals 43 to 46, inclusive. The present invention is not primarily concerned with the particular details per se of the planting units, and hence the latter are not shown in detail. For the purposes of the present description it will be sufficient to note that each unit is pivotally connected with the front transverse frame member by a plurality of links which permit the independent vertical movement of each of the units relative to the supporting frame and to each other. Figure 4 illustrates the preferred form of link means, and since the construction of each of the units is the same for all of them, a description of the planting unit 45 shown in Figure 4 will suffice. Referring to that figure, it will be seen that the planting unit includes a seed box 50, a shank or standard 51 and a runner or ground engaging tool 52 which serves as a furrow opener for opening the furrow to receive the seed dropped through the shank 51. Each planter unit also includes suitable seed depositing mechanism of conventional construction driven from a longitudinally extending shaft 53 through bevel gears 54.

The connection between each planting unit and the front transverse frame bar comprises a pair of parallel links or arms 58 and 59, these links being connected at their rear ends with the shank 51 while their forward ends are pivotally connected with the main frame 10. The lower links 59 are connected with the front frame member 11 by means of brackets 60 attached to the frame bar, and the upper links 58 are connected with castings 61 bolted or otherwise secured to the transverse frame member 11 (see Figure 1) and which include gear housings 62 enclosing the bevel gears by which the shafts 53 are rotated.

The bevel gears disposed within the several housings 62 are driven from a transversely disposed seed selecting drive shaft 65 which is journaled for rotation on the main frame 10 and rotated by power derived from the two supporting wheels 21 and 22 by means including differential mechanism which will now be described.

Secured to each of the supporting wheels, or to the axle thereof, is a driving sprocket over which is trained a driving chain. The driving chain for the supporting wheel 21 is indicated by the reference numeral 71, the driving chain for the wheel 22 being indicated by the reference numeral 73. Differential mechanism of novel construction is driven from the two driving chains 71 and 73 and, referring more particularly to Figures 1 and 2, such differential mechanism includes a transverse shaft 75 disposed forwardly of the supporting wheels and supported by bearings on certain of the longitudinally extending frame members. Preferably, the shaft 75 is supported at three points—by bearing means 76 connected with or forming a part of a bracket 77 bolted to the frame member 14; by bearing means 78 adjustably supported by a standard 79 fixed to a bracket 80 carried by the central longitudinal frame members 16 and 17; and by bearing means 81 formed integral with or secured to a bracket 82 carried by the longitudinal frame member 19 and connected with the frame member 18 by a brace 83. The bracket 82 is secured to the frame member 19 by bolts 85 or the equivalent, as best shown in Figure 4. In this way the transverse shaft 75 is supported on the main frame in a simple and sturdy manner and, furthermore, affords a sturdy support for the other parts constituting the differential mechanism.

One end of the shaft 75 has secured to it a sprocket 90 over which the forward portion of the driving chain 73 is trained, as best shown in Figure 4. The opposite end of the shaft 75 receives and supports a sleeve or tubular shaft section 91, the laterally outer end of which is provided with a sprocket 92 over which the forward portion of the other driving chain 71 is trained. By virtue of this construction, therefore, the shaft 75 is driven from one of the supporting wheels and the shaft 91 is driven from the other supporting wheel, the two shafts constituting, in general, transversely disposed shaft means supported for rotation on the main frame 10 and driven from the supporting wheels for the frame.

At its intermediate portion, the shaft 75 has a bevel gear 95 secured thereto, as by pins 96, and disposed adjacent the bevel gear 95 and journaled for rotation on the shaft 75 is a similar and oppositely disposed bevel gear 97 to which the laterally inner end of the tubular shaft section 91 is fixed, as by a threaded connection similar to the connection by which the sprocket 92 is secured to the tubular shaft 91 (see Figure 2). Adjacent the two oppositely disposed bevel gears 95 and 97 and journaled within the bearing means 78 is a relatively short sleeve 100, this sleeve serving as the means for supporting the intermediate portion of the shaft 75 in its bearing means 78. The sleeve 100 includes a forked member 101 (see Figure 1) having arms which embrace the bevel gears 95 and 97 and which support two differential pinions 104 and 105, both of which mesh with the bevel gears 95 and 97. Preferably, the forked member 101 is formed integral with the inner end of the sleeve member 100, but this form of construction is, of course, not necessary, since the forked member may be separately formed and secured to the sleeve in any manner desired. The sleeve member 100 carries two driving sprocket means, one in the form of a single sprocket 110 keyed or otherwise secured to the sleeve, the other driving sprocket means comprising three interconnected sprockets 111 splined upon and adjustably secured to the laterally outer end of the sleeve 100.

The shaft members 75 and 91 thus constitute a power shaft means through which power is delivered from the two supporting wheels to a differential mechanism which, in turn, transmits the power thus delivered to a driven member 100 from which energy is derived for operating the several mechanisms of the machine.

For driving the seed selecting drive shaft, power is taken from any of the sprockets 111 on the driven sleeve member 100. For this purpose a driving chain 115 is trained over the sprocket 111 and over a sprocket secured to a sleeve 116 which extends into the housing 117 enclosing the usual seeding shaft clutch mechanism and gears by which the seed selecting drive shaft 65 is rotated. The clutch mechanism 117 is controlled by more or less conventional check row mechanisms, including check forks 120 and 121, best shown in Figure 1, and an associated trip shaft 122. The seed selecting drive shaft is adapted to be rotated through a number of degrees responsive to the rocking of the trip shaft 122 by the actuation of the check forks 120 and 121. The extent of rotation of the seed selecting drive shaft 65 each time before the check fork is tripped is controlled through a variable drop lever 123 or the equivalent. The specific details of the seed selecting mechanism and the drive means therefor do not per se form any essential part of the present invention other than in the relations defined, and, therefore, no further description of these parts is deemed to be necessary. It is important, however, to note that the seed selecting mechanism in general is actuated by power derived from the differentially driven sleeve member 100.

The driven sleeve member 100 is also connected to drive the means forming the power lift unit for raising and lowering the several planter units. To this end the main frame 10 carries journaled thereon a lifting rock shaft 130 provided with a plurality of arms 131 connected, as by chains 132, with the lower end of the shanks or standards 51 of the planter units. Preferably, the lifting rock shaft 130 is disposed adjacent the rear frame bar 12 and supported by the upturned ends of the longitudinal frame bars. As will be apparent, rocking of the shaft 130 raises and lowers the several units. Actuation of the lifting rock shaft 130 is controlled by a power lift clutch deriving its power also from the driven sleeve member 100. The power lift clutch is indicated in its entirety by the reference numeral 135 and, as shown in Figure 5, is seen to comprise a clutch mechanism of the half revolution type. A supporting member in the form of a shaft 137 has one end fixed to the longitudinal frame member 11 by means of rivets 138 or the like.

The driving and driven elements of the clutch are indicated, respectively, by the reference numerals 140 and 141. The driving element 140 is in the nature of a constantly rotating member and is in the form of a drum having the usual internal corrugations 143 and a hub 144 journaled for rotation on the supporting shaft member 137. Preferably, the hub 144 is formed integrally with the driving drum 140. A driving sprocket 145 is fixed to the drum 140 by bolts 146 and nuts 147. A drive chain 149 is trained over the driving sprocket 145 and the sprocket 110 fixed to the sleeve member 100. Thus, through the latter chain and sprocket connection with the sleeve member 100, the driving member 140 of the clutch is constantly rotated from power derived from both ground wheels 21 and 22 through the differential mechanism associated with the sleeve member 100 and supported on the transverse power shaft 75.

The driven element 141 of the clutch 135 includes the drum 150 which telescopes over the drum 140. The driven drum 150 carries the usual clutch dog 151 on one end of which is pivoted a roller 152 by means of a pin 153. The pin 153 extends from the clutch dog 151 through a slot in the drum 150. The driven clutch part is journaled for rotation on the supporting shaft 137 and includes an integral hub or sleeve portion 156 which receives and supports one end of the shaft 137. The hub 156 is journaled within a bearing 160 fixed on the longitudinal frame member 16.

Normally, the roller 152 is held out of engagement with the corrugations 143 by means of the usual control lever 161 carrying a roller 162 which rests in one of the two recesses 165 on the periphery of the drum 150 and contacts with the dog 151 for holding it in a position to maintain the roller 152 out of engagement with the corrugations 143. When the control lever 161 is tripped the dog 151 is released so that the roller 152 engages the corrugations 143 and momentarily locks the driven clutch element with the driving clutch element for a half revolution, at which time the driven clutch element is again released. The hub 156 of the driven clutch element carries an arm 170 secured thereto or formed integrally therewith, and this arm is link connected, by link means 171, with an arm 172 fixed to the rock shaft 130. The latter rock shaft is preferably square in cross section and is journaled in suitable bearings 175 depending from the rear frame member 12, as best shown in Figure 4. Operation of the rock shaft swings the several arms 131 and, acting through the several chains 132, raises the planter units. The rotation of the driven clutch element 141 continues for a half revolution, at which time the roller 162 falls into the opposite recess 165 to disengage the roller 152.

According to the principles of the present invention the planter is also provided with fertilizer attachment units of more or less conventional construction. Preferably, each of the planter units is provided with an attachment. These attachments include a fertilizer container 180, fertilizer feeding mechanism 181 which is operated by means of a rotatable shaft 182 to continuously feed fertilizer through a discharge tube 183, and suitable means, such as bracket 184, or the like, for supporting the various fertilizer attachment units on the rear transverse frame member 12 disposed at the rear of the upturned ends of the longitudinally extending frame members. The fertilizer feeding shaft 182 is rotated by means of a sprocket 187 fixed to the shaft and a chain 188 trained over the sprocket 187 and over a driving sprocket 190 mounted over the ends of the bolts 146 and fixed thereto by means of nuts 192. In this way, the fertilizer feeding mechanism is driven from the constantly rotating element of the power lift clutch 135.

The present invention is also concerned with the provision of new and novel structure having to do with the reeling up of the check wire in cases where the implement is a check row machine. Specifically, the present invention contemplates reeling up the check wire by power derived from the two supporting wheels, just as the seeding mechanism, the power lift, and the fertilizer feeding mechanism are also driven from the same source. During the operation of the machine in unreeling the check wire, the reel, indicated in Figure 1 by the reference numeral 190, is mounted upon a laterally extending bracket 191, so that the reel is supported in such a position that the operator may plant at the same time the wire is unreeled and paid out. For the purpose of reeling the check wire by power the present invention contemplates the provision of a rotatably mounted shaft 193 of square cross section and provided with cylindrical end portions 194 and 195, as best shown in Figure 6. Within the reel 190 a pair of friction elements are provided, one of which is fixed to the reel and the other of which has a square opening for fitting over the shaft 193 as well as over the bracket 191. The cylindrical portion 194 has bearing support in a bearing 198 formed integrally with the bracket 82. The other cylindrical portion 195 is received in a bearing 200 formed by circularly bending the end of a bracket member 201 extending rearwardly and upwardly from the front frame member 11 and reinforced by a strut 202. The shaft 193 is held in position by means of a washer 205 which bears against one side of the bearing 200 and is held against movement relative to the shaft 193 by means of a cotter pin 206. To remove the shaft 193, as is necessary when placing or removing the reel, all that is required is to merely remove the cotter pin 206 and slide the shaft 193 laterally until the cylindrical portion 194 is moved out of the bearing 198 and the cylindrical portion 195 is clear of the bearing 200. The width of the upper open side of the latter bearing is greater than the thickness of the squared portion of the shaft 193, as a result of which the shaft may be lifted free of its supports when the bearing portions are cleared of the associated journal means.

In the preferred construction, the shaft 193 is adapted to be rotated by means of power derived from the ground wheel 22 through a connection which comprises a slidable gear member 210 shiftable axially along the shaft. The gear member includes a hub 211 and a toothed portion 212 which may be moved into mesh with a gear 214 fixed on the end of the shaft 75, as best shown in Figures 3 and 4. The gear 210 may be locked in this position by means of a cotter pin 215 (see Figure 3) passing through a hole 216 in the hub 211 and through a hole 217 in the shaft 193 provided for this purpose. Thus, it is a simple matter to arrange the reeling mechanism to be driven by power derived from the supporting wheels.

According to the present invention, use is made of the reeling mechanism for also establishing a driving connection for the wire distributing mechanism. The latter is indicated in Figures 1 and 3 by the reference numeral 225 and is seen to comprise a shaft 226 journaled in bearings 227 and 228, each adjustably mounted on the front transverse frame member 11 as by a pin and slot construction 228. The shaft 226 is provided with a double thread, one a right-hand thread and the other a left-hand thread, and on the shaft is positioned a traveling nut 231 provided with the usual mechanism for causing the nut to travel back and forth over the double threads as the shaft 226 is constantly rotated whenever driving relation is established. The traveling nut member 231 is provided with an elongated eye 232 open at the upper portion thereof through which the check wire may be threaded. Thus, as the traveling nut member 231 shifts back and forth along the shaft 226 the check wire is guided so as to be distributed uniformly over the reel 190.

The shaft 226 is adapted to be rotated by means of a sprocket 235 fixed on one end of the shaft 226, the sprocket 235 being connected by means of a driving chain 236 with the gear portion 239 of a sprocket and gear member 240 journaled on a bolt 241 fixed to the side of the bracket 82, as best shown in Figures 4 and 6.

The gear portion 245 of the member 240 is positioned to mesh with the slidable gear 210 when the latter is moved into engagement with the driving gear 214. The slidable member 210, therefore, not only provides a driving connection for the reeling shaft 193 but also for the wire distributing mechanism 225. Sliding the gear 210 out of engagement with the driving gear 214 not only disconnects the drive to the reeling shaft 193 but also to the distributing mechanism 225. Of course, unless the reeling shaft is operated there is no necessity of rotating the wire distributing mechanism. Thus, by virtue of the present invention, a simple and inexpensive drive is provided for both the reeling shaft and the wire distributing mechanism wherein the number of parts is reduced.

The operation of the planter is believed to be apparent from the above description. The forward end of the draft frame and the portion of the front of the implement is supported upon the rear of the tractor which is utilized to propel the implement. The two supporting wheels serve to drive both the seeding mechanism and the power lift mechanism, as well as the fertilizer distributing means. The two supporting wheels drive these operating parts through a differential mechanism by virtue of which power is delivered to a member from which the energy for driving the various units is derived. Rotation of the constantly driven element of the power lift clutch, by virtue of its connection with the differentially driven member just mentioned, serves to transmit the drive directly to the fertilizer distributing means. The differential mechanism referred to includes transversely disposed power shaft means, one end of which is connected to drive the reeling shaft and the associated check wire distributing mechanism, driving relation for the reeling shaft and the distributing mechanism being established through a single drive transmitting element.

While I have described above the preferred construction in which the principles of the present invention are embodied, it will be apparent that my invention is not to be limited to the specific details shown and described, but that, in fact, widely different means may be employed in the practice of the broader aspects of my invention.

What I claim, therefore, and desire to secure by Letters Patent is:

1. A multiple row planter of the class described comprising a main frame, a plurality of planting units movably carried thereby for relative vertical movement, means for raising and lowering said units including a power lift clutch, means for driving said units including a seed selecting drive shaft, and means including a differential drive mechanism for delivering power to said drive shaft and said lifting clutch.

2. A multiple row planter of the class described comprising a main frame, a plurality of supporting wheels therefor, a plurality of planting units carried by the frame for vertical movement relative thereto, means for raising and lowering said units including a rock shaft and a power lift clutch, means for driving said units including a seed selecting drive shaft journaled on said frame, driving connections from at least two of said supporting wheels, and differential drive mechanism actuated by said connections for delivering power to said selecting drive shaft and said power lift and clutch.

3. A multiple row planter of the class described comprising a main frame, a pair of supporting wheels therefor, a plurality of planting units movably carried by said frame for vertical movement relative thereto, a lifting rock shaft journaled on said frame and operatively connected with said units for raising and lowering the same, means for actuating the rock shaft including a power lift clutch mounted on the frame, and differential drive mechanism for delivering power to said clutch from both of said supporting wheels.

4. A multiple row planter of the class described comprising a main frame having transverse frame members and a plurality of longitudinally extending frame members connected with the transverse frame members, laterally spaced supporting wheels journaled in bearings on certain of said longitudinally extending members, a seed selecting drive shaft journaled on said frame adjacent the forward portion thereof, a plurality of planter units movably mounted on said frame and capable of vertical movement relatively thereto, a lifting rock shaft journaled on said frame adjacent the rear portion thereof and operatively connected to raise and lower said planter units, and means for delivering power to the seed selecting shaft and the rock shaft comprising laterally extending shaft means mounted on said frame between the seed selecting shaft and the rock shaft, differential means associated with said shaft means, a power lift clutch arranged to operate said rock shaft, said differential mechanism being adapted to drive both the power lift clutch and the seed selecting shaft, and means establishing driving connections between both of the supporting wheels and the laterally outer ends of said shaft means.

5. A multiple row planter of the class described comprising a main frame having transverse frame members and a plurality of longitudinally extending frame members connecting the transverse members, supporting wheels journaled on certain of said longitudinal frame members, a plurality of planter units disposed generally between said transverse frame members and being vertically movable relative to the main frame, a lifting rock shaft journaled on the main frame and operatively connected with each of said units to raise and lower the same, a seed selecting drive shaft journaled on the main frame and operatively connected to actuate the seed selecting mechanism of said units, a transversely extending shaft journaled in bearings supported by certain of said longitudinal frame members, means connecting one end of said transversely extending shaft with one of said supporting wheels whereby the shaft may be driven therefrom, a tubular shaft disposed over one end of said transversely extending shaft and operatively connected to be driven by the other of said supporting wheels, and differential mechanism mounted on the transversely extending shaft and connected therewith and with said tubular shaft for delivering power from both of said supporting wheels to both the seed selecting drive shaft and the lifting rock shaft.

6. A multiple row planter of the class described comprising a main frame including a row of transversely extending frame members and a plurality of interconnecting longitudinally extending frame members, a pair of supporting wheels journaled on certain of said longitudinal frame members and disposed between adjacent members, a plurality of planter units movably carried by the frame for relative vertical movement, a lifting rock shaft journaled on said frame and operatively connected with the planter units to raise and lower the same, a power lift clutch mechanism disposed on the central longitudinal member and operatively connected to actuate said rock shaft, a seed selecting drive shaft journaled on the main frame and connected to drive the seed selecting mechanism of said units, transversely extending differential mechanism journaled on the longitudinal frame members associated with the supporting wheels and the power lift clutch, and means connecting said differential mechanism with said supporting wheels and with the power lift clutch and the seed selecting drive shaft.

7. A planter of the class described comprising a main frame having transverse and longitudinally extending frame members, supporting drive wheels for said frame, a plurality of planter units movably supported by said frame and vertically adjustable relative thereto, a lifting rock shaft journaled on said frame and operatively connected with said units to raise and lower the same, means including a power shaft journaled on the central longitudinally extending frame members for driving said units, means operatively connecting said drive wheels with said power shaft, a power lift clutch mounted on said central longitudinal frame members, and means connecting said clutch with said power shaft and with said lifting rock shaft.

8. A planter of the class described comprising a main frame including transverse and longitudinally extending members, vertically adjustable planting means carried by said main frame, a lifting rock shaft journaled on said frame and operatively connected with said planting means for raising and lowering the latter, a power shaft journaled for rotation on certain of said longitudinally extending frame members, a supporting member secured to the central pair of longitudinally extending frame members, a bearing bracket supported by said member and rotatably receiving said power shaft, a power lift clutch mounted rearwardly of said power shaft and disposed on said central pair of longitudinally extending members, means disposed adjacent said bracket and driven from said power shaft for operating said power lift, and means connecting the latter with said rock shaft for raising and lowering said planting means by energy derived from said power shaft.

9. A planter of the class described comprising a main frame having transverse and longitudinally extending frame members, planting means carried by said frame and vertically adjustable relative thereto, a lifting rock shaft carried by the main frame and operatively connected with said planting means for raising and lowering the latter, and means for actuating the lifting rock shaft comprising a power lift clutch mechanism disposed on the central longitudinally extending frame members and including a shaft having one end fixed to one of said members and a rotatable element disposed on the other end thereof and journaled in the other of said central longitudinally extending members.

10. A planter of the class described comprising a main frame having transverse and longitudinally extending frame members, a plurality of planter units movably carried by said frame and adapted to be vertically adjustable relatively thereto, a rock shaft journaled on said frame and operable to raise and lower said units, a power lift clutch journaled on said frame and including a non-rotatable shaft having one end fixedly secured to one of said longitudinally extending frame members and the other end thereof extending laterally beyond the adjacent frame member, bearing means mounted on said adjacent frame member, a power lift clutch element journaled for rotation on said fixed shaft, a second power lift clutch element journaled for rotation in said bearing means and receiving the laterally extending end of said shaft, and means connecting the last mentioned clutch element with said rock shaft.

11. A planter of the class described comprising a main frame having transverse and longitudinally extending frame members, a plurality of planter units movably carried by said frame and adapted to be vertically adjustable relatively thereto, fertilizer distributing means carried by said frame, a rock shaft journaled on said frame and operable to raise and lower said units, a power lift clutch journaled on said frame and including a non-rotatable shaft having one end fixedly secured to one of said longitudinally extending frame members and the other end thereof extending laterally beyond the adjacent frame member, bearing means mounted on said adjacent frame member, a power lift clutch element journaled for rotation on said fixed shaft, a second power lift clutch element journaled for rotation in said bearing means and receiving the laterally extending end of said shaft, means connecting the last mentioned clutch element with said rock shaft, and means operatively connected with the first mentioned clutch element for driving said fertilizer distributing means.

12. A planter of the class described comprising a main frame, a plurality of planter units movably carried by the main frame and vertically adjustable relatively thereto, a transversely disposed lifting rock shaft mounted on said frame, power shaft means journaled on said main frame, a power lift clutch operatively connected with said rock shaft and including a constantly driven member connected with said power shaft means, fertilizer distributing mechanism carried by said frame, and means connected with said constantly driven member for driving said fertilizer distributing mechanism.

13. An agricultural implement comprising a main frame, supporting wheels therefor, a transversely disposed driving shaft, bearing means carried by the frame and transversely spaced to receive said shaft, a driving connection between one end of said shaft and one of said supporting wheels, a sleeve journaled over the other end of said shaft, a driving connection between said sleeve and the other of said supporting wheels, a second sleeve journaled on said shaft adjacent the inner end of said first sleeve, differential mechanism connected with said shaft and said first sleeve for delivering power therefrom to said second sleeve, a sprocket fixed to said second sleeve, a lifting rock shaft journaled on said frame, a seed selecting shaft also journaled on said frame, a power lift clutch mounted on said frame and operatively connected with said rock shaft, a driving connection between said second sleeve and said power lift clutch, and a second driving connection from said second sleeve to said seed selecting shaft.

14. An agricultural implement comprising a frame, supporting wheels therefor, a transversely disposed power shaft journaled on said frame, bearing means for said shaft disposed at the ends thereof, a driving connection between one end of said shaft and one of said supporting wheels, a sleeve journaled on the other end of said shaft and operatively connected with the other of said supporting wheels, a second sleeve journaled on said shaft adjacent the intermediate portion thereof, bearing means carried by the frame and supporting said second sleeve and the intermediate portion of said shaft, differential mechanism disposed adjacent said bearing means and operatively connected with said shaft and said first sleeve for driving said second sleeve, a power lift clutch mounted on said frame, a sprocket mounted on said second sleeve and operatively connected with said power lift clutch for driving the same, a seed selecting shaft journaled on said frame, and a second sprocket on said second sleeve operatively connected to drive said seed selecting shaft.

15. An agricultural implement comprising a main frame, a vertically shiftable ground engaging tool carried thereby, a power lift clutch operatively associated with said tool for raising and lowering the same, supporting wheels for said frame, power shaft means journaled on said frame and comprising two sections, driving means connecting one section with one of said supporting wheels, separate driving connections between the other supporting wheel and the other shaft section, differential mechanism disposed between said sections and including a rotatable member deriving power from both sections, and means connecting said rotatable member with said power lift clutch.

16. A multiple row planter of the class described comprising a main frame, a pair of laterally spaced supporting wheels for said frame, a plurality of planter units carried by the frame for independent vertical movement relative thereto, two of said units being disposed between said wheels and one unit being disposed laterally outwardly of each wheel, operating means for said units including a seed selecting shaft journaled on the frame adjacent the forward portion thereof and extending laterally outwardly beyond said wheels, laterally extending divided shaft means journaled on said frame rearwardly of said seed selecting shaft and having its outer ends operatively connected to be driven by said supporting wheels, differential mechanism operatively connecting the inner ends of said divided shaft means, and means for delivering power from said differential mechanism to said seed selecting shaft.

17. An agricultural implement comprising a frame, a pair of supporting wheels therefor, an operating unit carried by said frame alongside said wheels, power shaft means journaled on said frame and spaced for and aft of said wheels and including separate sections, means separately connecting said sections, respectively, with said supporting wheels, differential mechanism connected in alignment with said shaft sections and spaced from the axis of said wheels, and means connecting said differential mechanism with said operating unit.

18. An agricultural implement comprising a main frame, an operating unit movably carried thereby for relative vertical movement, means for raising and lowering said unit including a power lift clutch, means for driving said unit including a drive shaft, and means including a differential drive mechanism for delivering power to said drive shaft and said lifting clutch.

19. An agricultural machine comprising a main frame having transverse frame members and a plurality of longitudinally extending frame members connected with the transverse frame members, laterally spaced supporting wheels journaled in bearings on certain of said longitudinally extending members, a drive shaft journaled on said frame adjacent the forward portion thereof, an operating unit movably mounted on said frame and capable of substantially vertical movement relatively thereto, a lifting rock shaft journaled on said frame and operatively connected to raise and lower said unit, and means for delivering power to the drive shaft and the rock shaft comprising laterally extending shaft means mounted on said frame between the drive shaft and the rock shaft, means establishing driving connections between both of the supporting wheels and the laterally outer ends of said shaft means, differential means associated with said shaft means and disposed between said rock shaft and said drive shaft, and means for actuating both the power lift clutch and the drive shaft from said differential mechanism.

20. An agricultural machine comprising a main frame, supporting wheels journaled on said frame, an operating means connected with and vertically movable relative to the main frame, a lifting rock shaft journaled on the frame and operatively connected with each of said operating means to raise and lower the same, a drive shaft journaled on the main frame and operatively connected to actuate said operating means, a transversely extending shaft journaled in bearings supported by said frame, means connecting one end of said shaft with one of said supporting wheels whereby the shaft may be driven therefrom, a tubular shaft disposed over one end of said first named shaft and operatively connected to be driven by the other of said supporting wheels, differential mechanism mounted on the first named shaft and connected therewith and with said tubular shaft, and separate means for delivering power from said differential means to the drive shaft and the lifting rock shaft.

21. An agricultural implement comprising a frame, a pair of supporting wheels therefor, an operating unit carried by said frame alongside said wheels, power shaft means journaled on said frame and spaced fore and aft of said wheels and adjacent the forward portion of the frame, said power shaft means including separate sections connected, respectively, with and deriving power from said wheels, differential mechanism connected in alignment with said shaft sections, means connecting said differential mechanism with said operating unit including a transverse shaft journaled adjacent the forward portion of said frame and adjacent said power shaft means, and means operatively connecting said unit for movement with respect to said frame about said transverse shaft.

22. A multiple row planter of the class described comprising a main frame, a pair of drive wheels supporting said frame, a plurality of planting units movably carried by the frame for relative vertical movement and disposed between said wheels, means for raising and lowering said units including a power lift clutch and a lifting rock shaft adjacent the rear of said frame, means for driving said units including a seed selecting drive shaft, means including a differential drive mechanism adjacent the forward portion of the frame operatively connected to receive power from said wheels, and means connected with said differential drive mechanism for delivering power to said drive shaft and said lifting clutch.

23. A multiple row planter of the class described comprising a main frame, a pair of drive wheels supporting said frame, a plurality of planting units movably carried by the frame for relative vertical movement and disposed adjacent said wheels, means for raising and lowering said units including a power lift clutch and a lifting rock shaft adjacent the rear of said frame, means for driving said units including a seed selecting drive shaft disposed adjacent the forward portion of the frame, means including a differential drive mechanism also disposed adjacent the forward portion of the frame and operatively connected to receive power from both of said wheels, said power lifting clutch being disposed rearwardly of said differential mechanism and forwardly of said rock shaft, means extending rearwardly from said differential drive mechanism for delivering power to said power lift clutch and lifting rock shaft, and means extending forwardly from said differential drive mechanism for delivering power to said seed selecting drive shaft.

24. A multiple row planter of the class described comprising a main frame including transverse and longitudinally extending members, a plurality of supporting wheels for said frame, a plurality of planting units carried by the frame for vertical movement relative thereto, means for raising and lowering said units including a rock shaft supported principally upon the rear transverse frame member and a power lift clutch disposed forwardly of said rock shaft and carried principally by said longitudinally disposed frame members, means for driving said units including a seed selecting drive shaft journaled on said frame and supported principally upon the forward transverse frame member, driving connections from said supporting wheels and including a differential drive mechanism disposed forwardly of said power lift clutch and rearwardly of said seed selecting drive shaft, means connecting said differential mechanism with said drive shaft and said power lift clutch, and means operatively connecting said power lift clutch with said rock shaft.

25. A multiple row planter of the class described comprising a main frame including a pair of transversely extending frame members and a plurality of interconnecting longitudinally extending frame members, a pair of supporting wheels journaled on certain of said longitudinal frame members and disposed between adjacent members, a plurality of planter units movably carried by the frame for relative vertical movement and including fertilizer distributing means having a transverse drive shaft, a lifting rock shaft journaled on said frame and operatively connected with the planter units to raise and lower the same, means including a power shaft journaled on the central longitudinally extending frame members for driving said units, means operatively connecting said drive wheels with said power shaft, a power lift clutch mechanism disposed on the central longitudinal members and operatively connected to actuate said rock shaft, a seed selecting drive shaft journaled on the main frame and connected to drive the seed selecting mechanism of said units, means operatively connecting said power shaft with the power lift clutch and seed selecting drive shaft, and means driven from the means which connects the power lift clutch with said power shaft for driving the fertilizer distributing shaft.

26. An agricultural implement comprising a main frame, vertically adjustable operating means carried by said frame, a lifting rock shaft journaled on said frame and operatively connected with said operating means for raising and lowering the latter, a power shaft journaled for rotation on said frame, a bearing bracket carried by said frame and rotatably receiving and supporting said power shaft, a power lift clutch mounted on said frame rearwardly of said power shaft, means disposed adjacent said bracket and driven from said power shaft for operating said power lift clutch, and means connecting the latter with said rock shaft for raising and lowering said operating means by energy derived from said power shaft.

27. An agricultural implement comprising a main frame having transverse and longitudinally extending frame members, a plurality of operating units movably carried by said frame and adapted to be vertically adjustable relative thereto, a rock shaft journaled on said frame and operable to raise and lower said units, a power lift clutch journaled on said frame and including a non-rotatable shaft supported on and fixedly secured to one of said longitudinally extending frame members, bearing means mounted on said adjacent frame member, a power lift clutch element journaled for rotation on said fixed shaft between said frame members, a second power lift clutch element journaled for rotation in said bearing means and receiving said fixed shaft, and means connecting the last mentioned clutch element with said rock shaft.

28. An agricultural machine of the class described comprising a main frame having longitudinally extending frame members, a plurality of operating units movably carried by said frame and adapted to be vertically adjustable relative thereto, fertilizer distributing means carried by said frame, a rock shaft journaled on said frame and operable to raise and lower said units, a power lift clutch journaled on said frame and including a non-rotatable shaft fixedly mounted on two of said longitudinally extending frame members, bearing means mounted on one of said frame members, a power lift clutch element journaled for rotation on said fixed shaft between said frame members, a second power lift clutch element journaled for rotation in said bearing means and receiving one end of said shaft, means connecting the last mentioned clutch element with said rock shaft, a pair of sprockets carried by said first mentioned clutch element, means connected with one of the sprockets for actuating the power lift clutch, and means operatively connected with the other sprocket to receive power therefrom for driving said fertilizer distributing means.

29. An agricultural implement comprising a main frame having transverse and longitudinally extending frame members, a plurality of operating units movably carried by said frame and adapted to be vertically adjustable with respect thereto, a rock shaft journaled on one of said transverse frame members and operable to raise and lower said units, a power lift clutch journaled on said frame and including a non-rotatable shaft supported on certain of said longitudinally extending frame members and extending laterally beyond one of them, means fixedly connecting the other end of said shaft to an adjacent longitudinally extending frame member, bearing means mounted on said one frame member, a power lift clutch element journaled for rotation on said fixed shaft between said longitudinal frame members, a second power lift clutch element journaled for rotation in said bearing means and including a laterally directed crank portion operable on the opposite side of said one frame member, said second power lift clutch element having a bore receiving one end of said fixed shaft, and link means connecting the crank portion of said second power lift clutch element with said rock shaft for actuating the same.

CHARLES H. WHITE.